(12) United States Patent
Wilcox et al.

(10) Patent No.: US 7,716,905 B2
(45) Date of Patent: May 18, 2010

(54) SENSING ASSEMBLY FOR DETECTION OF ONE OR MORE PLANTS

(75) Inventors: Timothy Amos Wilcox, Dallas Center, IA (US); Frederick William Nelson, Waukee, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/121,995

(22) Filed: May 16, 2008

(65) Prior Publication Data

US 2009/0282794 A1    Nov. 19, 2009

(51) Int. Cl.
*A01D 41/14* (2006.01)
*A01D 75/28* (2006.01)
*A01D 46/08* (2006.01)

(52) U.S. Cl. ............... 56/10.2 E; 56/10.2 F; 56/10.2 R (58) Field of Classification Search ............. 56/10.2 R, 56/10.2 F, 15.4, DIG. 10, 10.2 D, 10.2 E; 33/382, 521; 172/2, 5
See application file for complete search history.

(56) References Cited

U.S. PATENT DOCUMENTS

| | | | | |
|---|---|---|---|---|
| 3,797,208 A | * | 3/1974 | Strubbe | 56/10.2 F |
| 3,851,451 A | * | 12/1974 | Agness et al. | 56/10.2 E |
| 3,886,718 A | * | 6/1975 | Talbot | 56/208 |
| 3,953,959 A | * | 5/1976 | Decruyenaere | 56/208 |
| 3,991,618 A | | 11/1976 | Stampfer et al. | |
| 4,126,984 A | * | 11/1978 | Gail | 56/10.2 R |
| 4,166,349 A | | 9/1979 | Coenenberg et al. | |
| 4,197,690 A | * | 4/1980 | Eistert et al. | 56/10.2 F |
| 4,199,925 A | * | 4/1980 | Quick et al. | 56/208 |
| 4,505,094 A | | 3/1985 | Demorest | |
| 4,528,804 A | * | 7/1985 | Williams | 56/10.2 F |
| 4,663,918 A | | 5/1987 | Williams et al. | |
| 4,776,153 A | * | 10/1988 | DePauw et al. | 56/10.2 E |
| 4,942,724 A | * | 7/1990 | Diekhans et al. | 56/10.4 |
| 5,307,611 A | | 5/1994 | Vardeman et al. | |
| 5,694,751 A | * | 12/1997 | Behnke | 56/10.2 F |
| 6,334,098 B1 | | 12/2001 | Shefer | |
| 6,588,187 B2 | * | 7/2003 | Engelstad et al. | 56/10.2 E |
| 6,758,029 B2 | * | 7/2004 | Beaujot | 56/10.2 E |
| 6,826,894 B2 | * | 12/2004 | Thiemann et al. | 56/10.2 E |
| 6,945,019 B1 | | 9/2005 | Sonnek et al. | |
| 7,222,474 B2 | * | 5/2007 | Rayfield et al. | 56/10.2 E |
| 7,430,815 B2 | | 10/2008 | Reichhardt | |
| 2006/0277885 A1 | | 12/2006 | Rauch | |
| 2007/0294906 A1 | | 12/2007 | Reichhardt | |

FOREIGN PATENT DOCUMENTS

| | | |
|---|---|---|
| AT | 264181 | 8/1965 |
| DE | 2362899 | 6/1975 |
| DE | 2555283 | 6/1977 |
| DE | 2705491 | 8/1978 |
| DE | 4412557 | 10/1995 |
| EP | 0136548 | 1/1988 |

* cited by examiner

*Primary Examiner*—Árpád Fábián-Kovács (57) ABSTRACT

A sensing assembly comprises a forward point for mounting on a crop divider associated with a header. At least one movable arm is capable of interacting with one or more plants standing in a field. A sensor detects a position of the movable arm. A mounting assembly operably supports the movable arm and the forward point, where a rear portion of the forward point is spaced apart from a forward edge of the crop divider and the at least one movable arm is located above a bottom portion of the forward point when the mounting assembly is secured to the crop divider.

16 Claims, 6 Drawing Sheets

SENSING ASSEMBLY FOR DETECTION OF ONE OR MORE PLANTS

FIELD OF THE INVENTION

This invention relates to a sensing assembly for detecting one or more plants (e.g., within a row of plants).

BACKGROUND OF THE INVENTION

An automatic steering system may be used for guiding a self-propelled harvesting machine with a desired alignment to a crop, among other possible applications. Steering systems for harvesting crop in rows usually utilize mechanical sensing devices interacting with the crop. Such sensing devices are mounted to the crop dividers of the header and comprise movable arms abutting the plants, stems or stalks and sensors for detecting the position or displacement of the arms.

In one illustrative prior art configuration for mounting the sensing device, arms extend through assigned openings in a modified crop divider. However, the openings tend to structurally weaken the crop divider. Further, in weedy or dense crop conditions, debris and crop residues tend to collect at the openings, reducing the performance of the crop divider and the sensing device.

There are several common problems associated with sensing devices for detecting the relative locations of one or more plants (e.g., stalks within rows) with respect to the harvesting machine with a header or similar implement configuration. First, if the sensing devices are mounted at the underside of the crop divider of the header, they are exposed to debris and objects on the ground and can be damaged. Further, for such sensing devices, the mobility of the arms becomes restricted due to the collected debris. Second, if the header is operated too close to the ground, the arms encounter the ground instead of the plants and provide incorrect signals to the steering system. Third, the plants are growing on ridges or mounds, the arms will encounter the ridge instead of the crop. Thus, there is a need for an improved sensing assembly.

SUMMARY OF THE INVENTION

In one embodiment, a sensing assembly comprises a forward point for mounting on a crop divider associated with a header. At least one movable arm is capable of interacting with one or more plants standing in a field. A sensor detects a position of the movable arm. A mounting assembly operably supports the movable arm and the forward point, where a rear portion of the forward point is spaced apart from a forward edge of the crop divider and the at least one movable arm is located above a bottom portion of the forward point when the mounting assembly is secured to the crop divider.

DESCRIPTION OF THE PREFERRED EMBODIMENT

Figure 1:
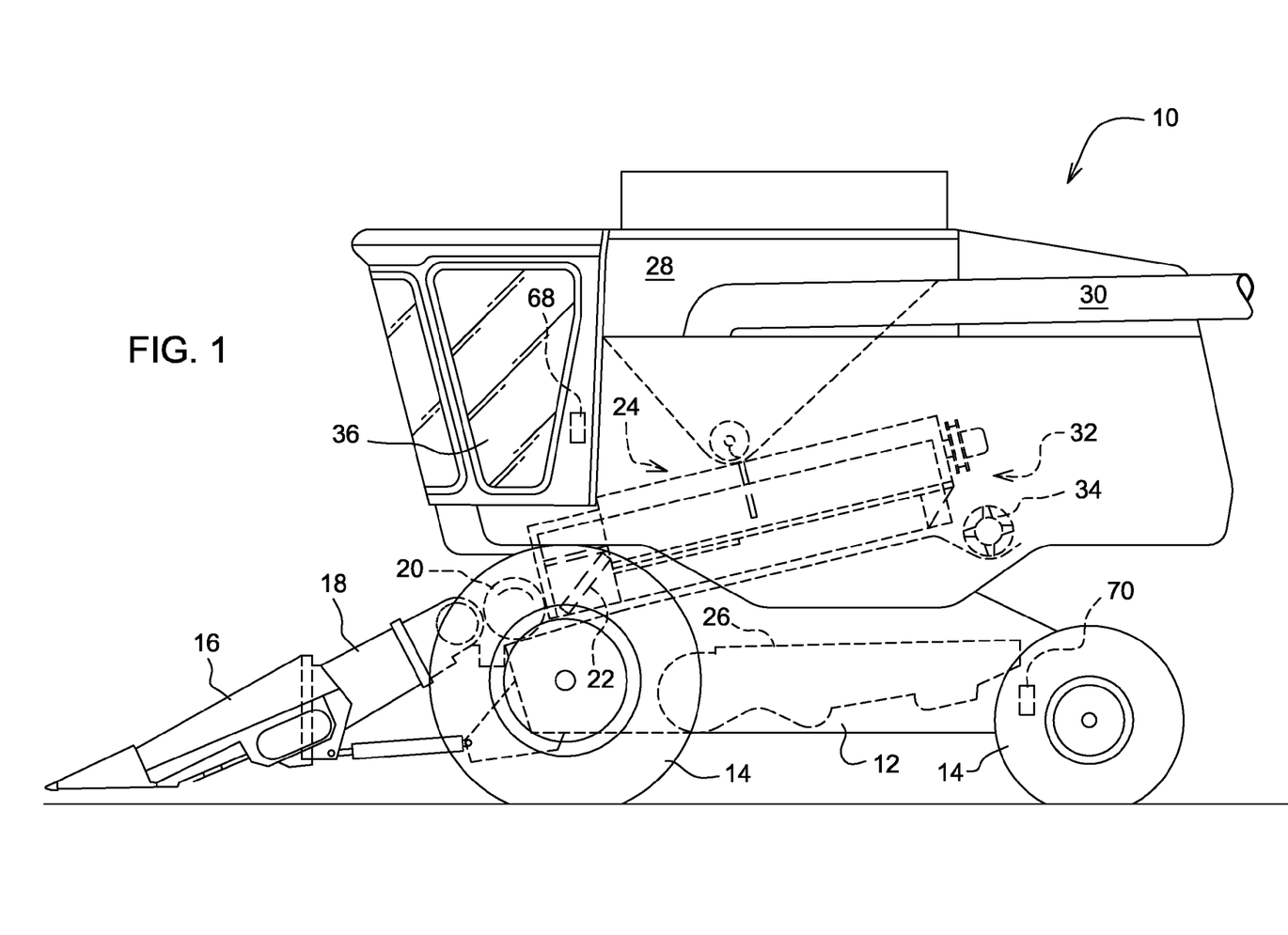
FIG. 1 is a side view of a self-propelled harvesting machine.

In accordance with one embodiment and referring to FIG. 1, a self-propelled harvesting machine 10 in the form of a combine is shown. The harvesting machine 10 comprises a supporting structure 12 associated with ground engaging wheels 14. Although the harvesting machine 10 is illustrated as having wheels, it could also have ground engaging tracks, either full tracks or half tracks. The harvesting machine 10 could also be a forage harvester. A header 16 is mounted (e.g., detachably mounted) to a feederhouse 18. The feederhouse 18 contains a conveyor for conveying the harvested crop to a beater 20 or other upstream device associated with the harvesting machine 10. The beater 20 may direct the crop upwardly through an inlet transition section 22 or similar opening to a rotary threshing and separating assembly 24.

As shown in FIG. 1, the illustrated threshing and separating assembly 24 is axially arranged in the harvesting machine 10. However, in an alternate embodiment, the threshing and separating assembly 24 could be arranged in another orientation relative to the longitudinal axis of the harvesting machine. For example, the threshing and separating assembly 24 may be configured as a conventional transverse threshing cylinder and concave assembly (e.g., and straw walkers). The rotary threshing and separating assembly 24 threshes and separates the harvested crop material. Grain and chaff fall through grates on the bottom of the assembly 24 to a cleaning system 26 The cleaning system 26 removes the chaff and directs the clean grain to a clean grain elevator (not shown). The clean grain elevator deposits the clean grain in grain tank 28. The clean grain in the tank can be unloaded into a grain cart or truck by unloading auger that feeds chute or outlet 30.

Threshed and separated straw is discharged from the axial crop processing unit through outlet 32 to discharge beater 34 or discharge rotary device. The discharge beater 34 in turn propels the straw out the rear of the harvesting machine 10. It should be noted that the discharge beater 34 could also discharge crop material other than grain directly to a straw chopper. The operation of the harvesting machine 10 may be controlled from an operator's cab 36, remotely via a wireless transceiver arrangement or via an on-board navigation system (e.g., optical navigation system or a location-determining receiver, such as a Global Positioning System (GPS) receiver with differential correction).

Figure 2:
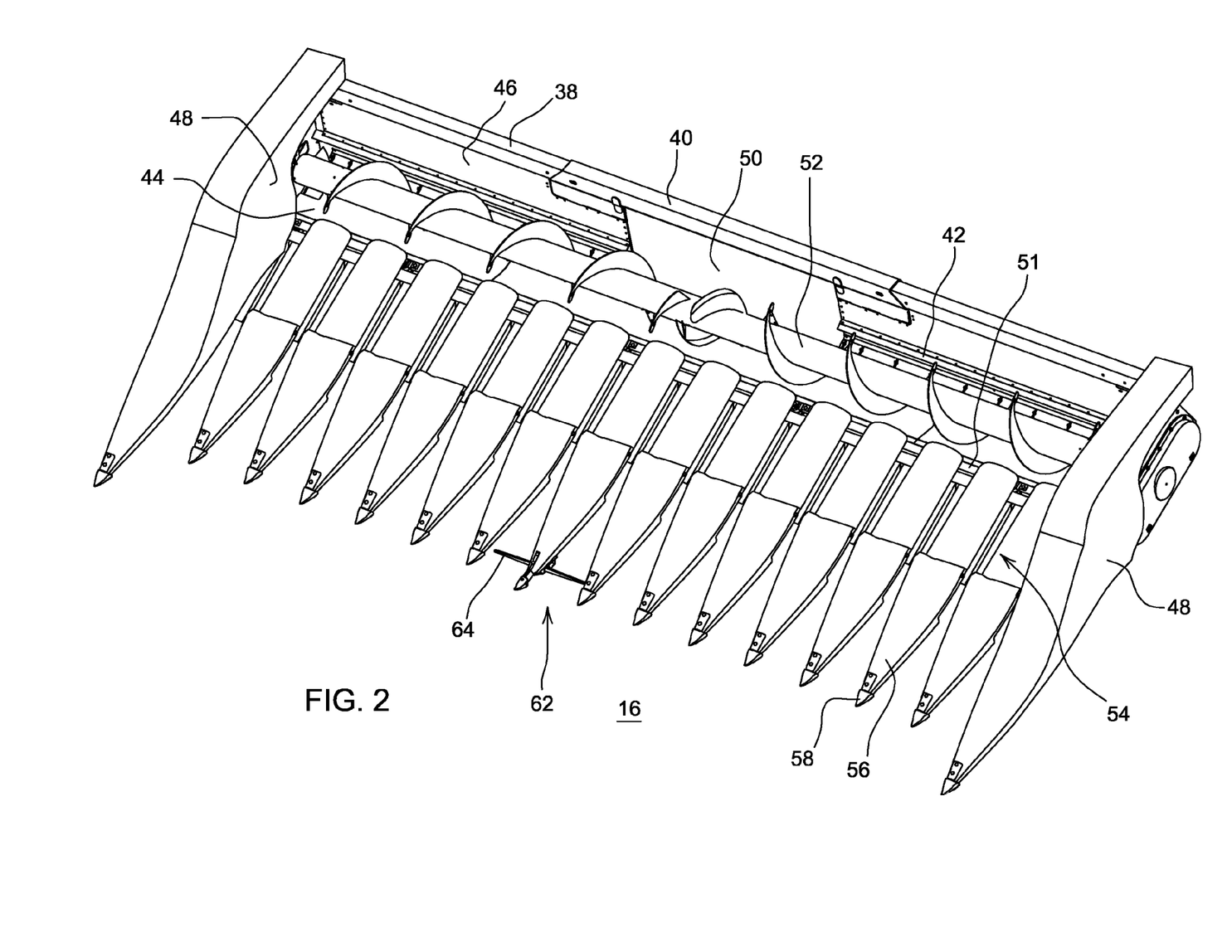
FIG. 2 is a perspective view of the header of the harvesting machine of FIG. 1.

In FIG. 2, in one illustrative embodiment the header 16 comprises a frame 38 that extends laterally, and that further comprises an upper beam 40, a lower beam 42, and a row unit support beam 51. The frame 38 comprises a trough 44, a rear wall 46 and end walls 48. An aperture 50 or opening is disposed in the center portion of rear wall 46 below upper beam 40 and above lower beam 42. The aperture 50 provides an opening for the transmission of crop material from the header 16 to the feederhouse 18 of the harvesting machine 10. Trough 44 extends laterally and is comprised of a laterally-extending curved sheet having a laterally-extending concave upper surface. Within trough 44, an auger 52 is mounted for receiving crop material from a plurality of row units 54 that are fixed to the row unit support beam. The row units 54 are mounted (e.g., rigidly mounted) to a row unit support beam 51 in side to side relationship and are distributed across the entire width of the header 16. In one illustrative configuration, each row unit 54 has two forwardly extending stalk rolls (not shown) that extend forward from the header 16 in the direction of travel for pulling the plant stalks or stems downward, two stripper plates above the stalk rolls forming a plucking gap for separating the ears or grain from the stalks, and two chain conveyors with attachment links for conveying the ears or grain towards the auger 52.

Between each two adjacent row units 54, a crop divider 56 is provided. The crop dividers 56 are rigidly or pivotally mounted around transverse axes in a defined pivot range to the adjacent row units 54 and are of a generally conical shape. For example, one or more of the crop dividers 56 may rotate vertically about an axis to compensate for differences or fluctuations in the land or terrain. In one embodiment, the crop dividers 56 are tapered towards the front or the direction of forward travel of the harvesting machine 10. In one embodiment, the crop dividers 56 are molded, pressed, cast, or otherwise formed or composed of a plastic, a plastic material with a filler or fiber reinforcement (e.g., carbon fiber), polymer, a polymer with a filler or fiber reinforcement (e.g., carbon fiber), an alloy, or a metallic material.

Figure 3:
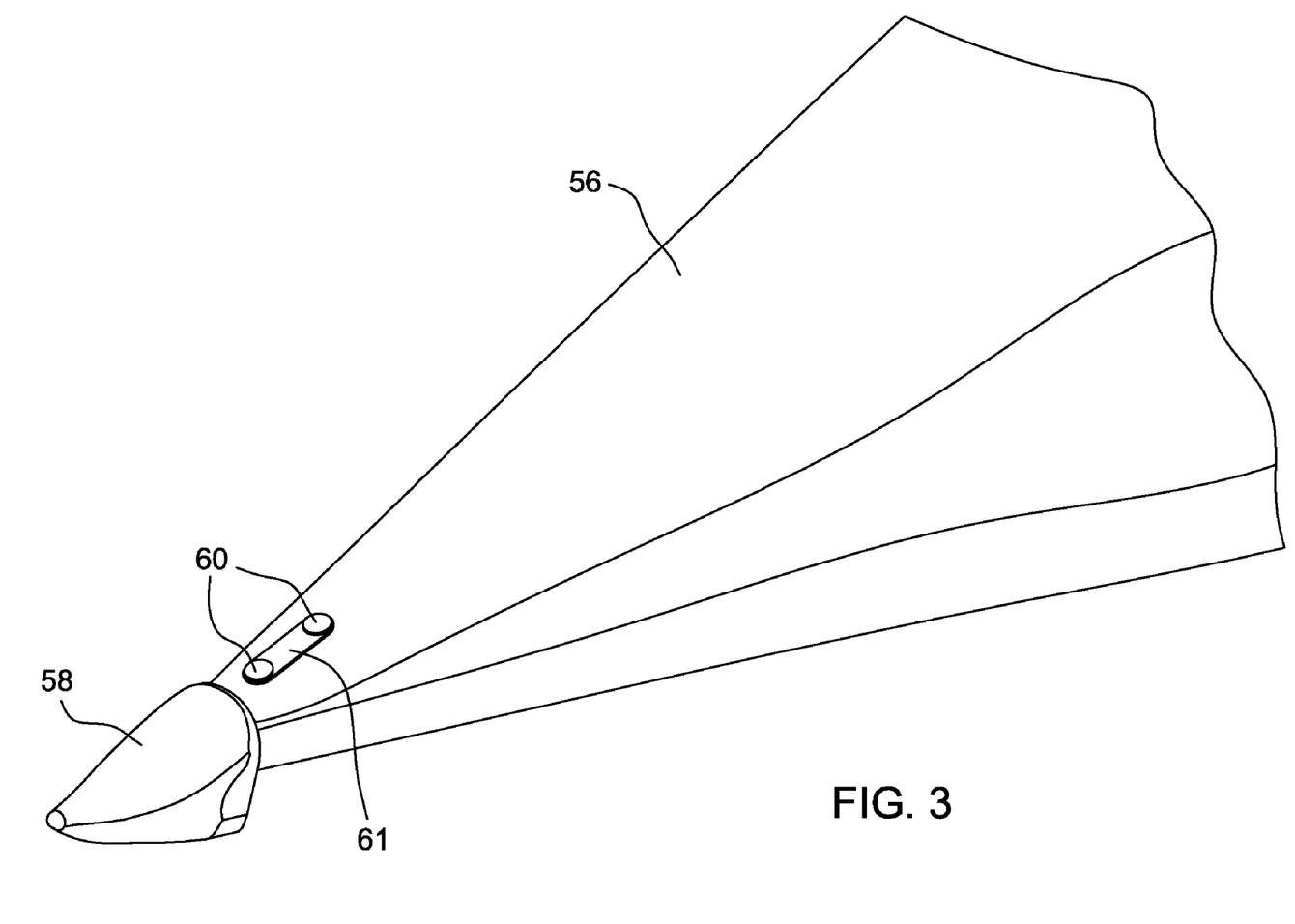
FIG. 3 is an enlarged perspective view of the front part of a crop divider of the header of FIG. 2 without a sensing assembly.

At the forward tip of the crop dividers 56, secondary points 58 are mounted, as shown in a larger scale in FIG. 3. In one embodiment, the secondary points 58 are composed of plastic (e.g., wear resistant plastic), a plastic material with a filler or fiber reinforcement (e.g., carbon fiber), polymer (e.g., a wear resistant polymer), a polymer with a filler or fiber reinforcement (e.g., carbon fiber), an alloy, or a metallic material. Each secondary point 58 has a generally conical shape and is tapered towards its tip. As best shown in FIG. 3, fasteners 60 penetrate through bores or holes in the top of the crop divider 56 and mount a rearwardly extending retainer (not visible) of the secondary points 58 to the crop divider 56. Although a metal strip 61 or washer is shown between the heads of the fasteners 60 and the crop divider, the metal strip or washer is optional and may be deleted in other embodiments.

Figure 4:
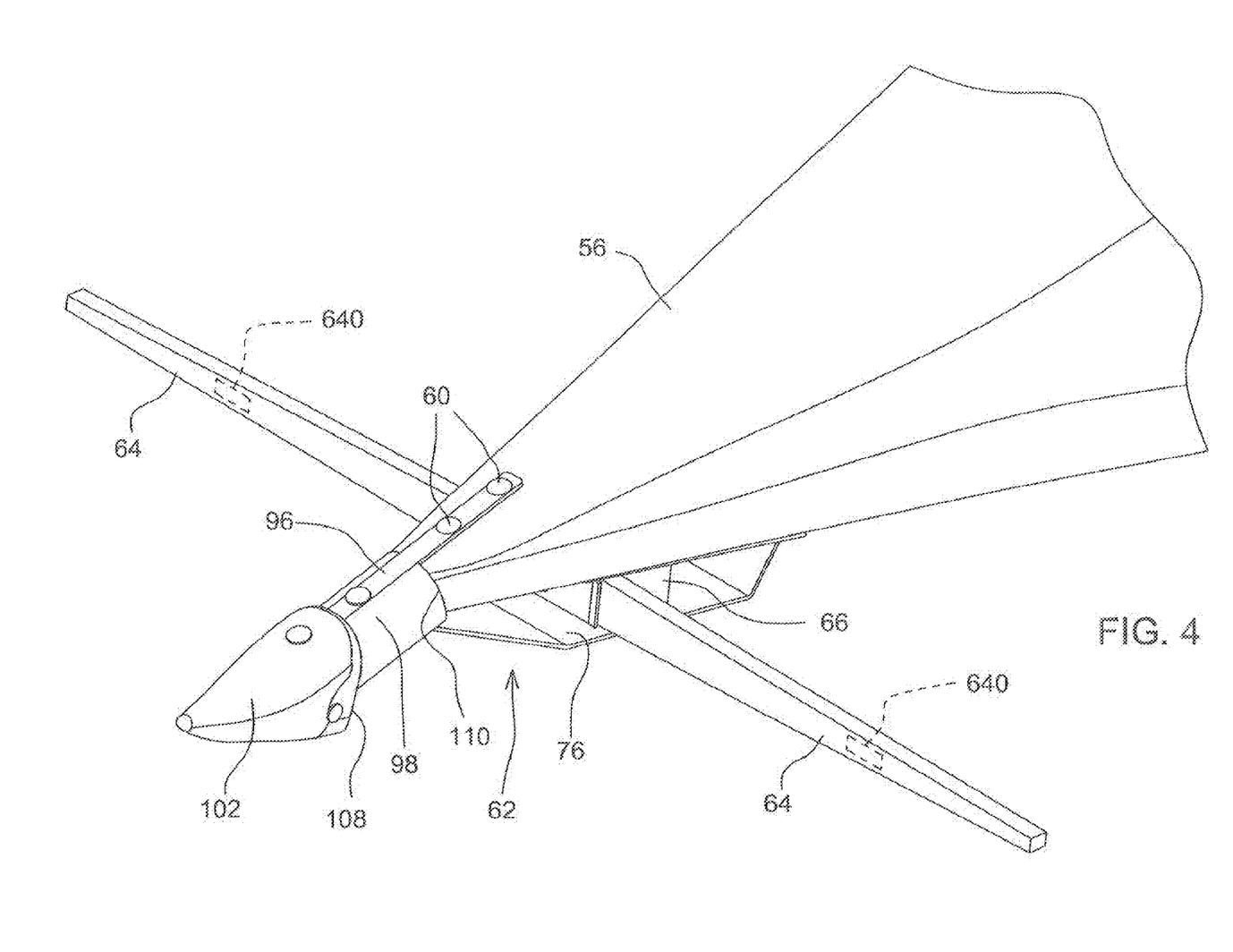
FIG. 4 is an enlarged perspective view of the front part of a crop divider of the header of FIG. 2 with a sensing assembly.
Figure 5:
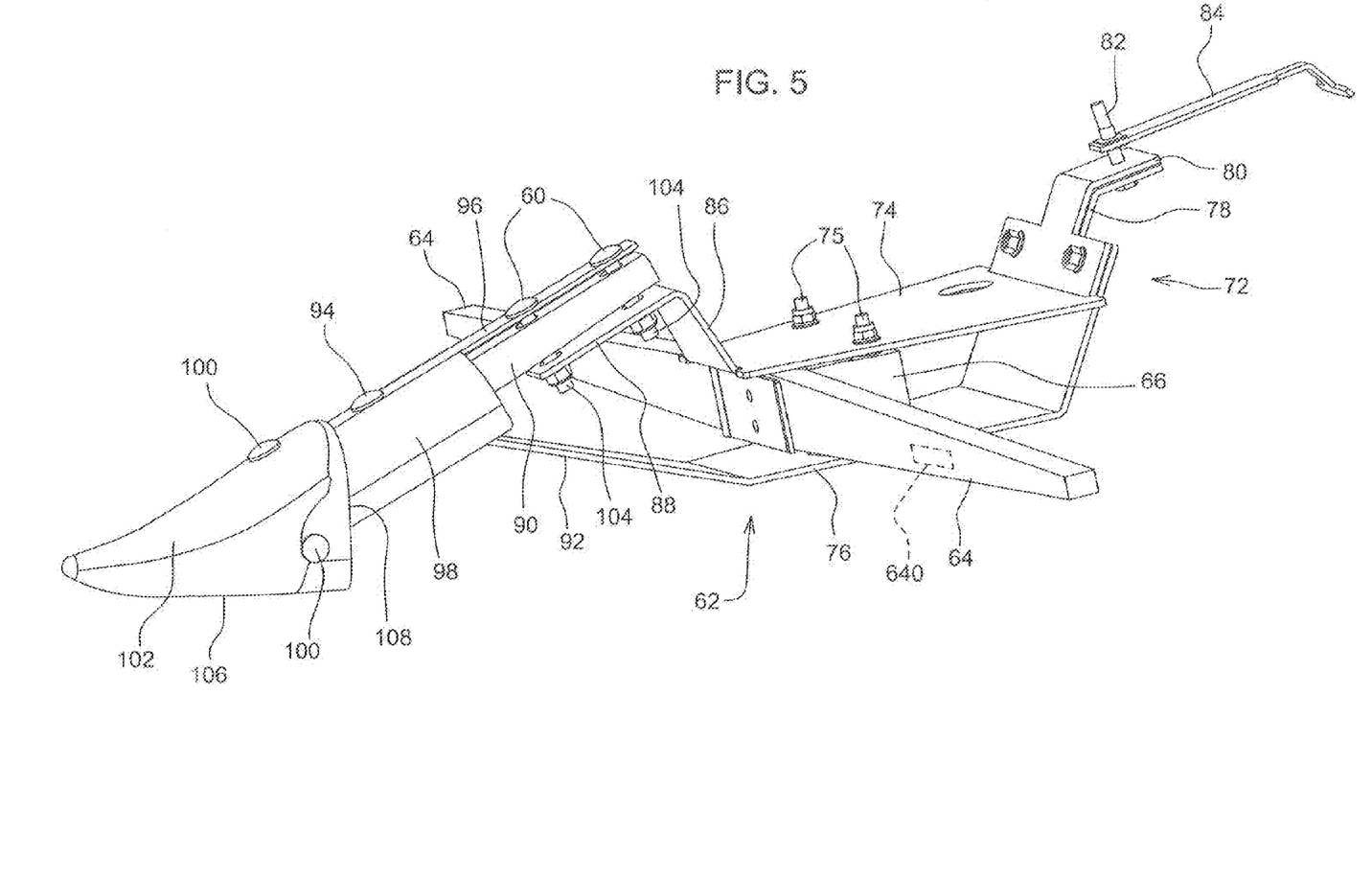
FIG. 5 is a perspective view of the sensing assembly.

A row sensing device 62 is mounted to a crop divider 56 at the center of the header 16, as shown in FIG. 2. The row sensing device 62 or the sensor 66 may be secured to the mounting assembly, such as at one or more generally horizontal plates (74, 76). The row sensing device 62 comprises two opposite, transversely extending, movable arms 64 from the same crop divider 56; or in another embodiment, from adjacent crop dividers 56. Each arm 64 is located on a side of the crop divider 56 and is arranged to interact with one or more plants (e.g., corn plants, stalks or otherwise) within rows. In one embodiment, the arms 64 are composed of an elastomer, an elastically deformable material, a resilient material, or a flexible material. For example, the arms 64 may be composed of synthetic rubber, natural rubber, a fiber-reinforced plastic, or a fiber-reinforced polymer. In an alternative embodiment, each arm 64 comprises a rigid member, frame or skeleton that is coated with an elastomer, an elastically deformable material, a resilient material or a flexible material. In one configuration, each arm 64 may be biased with a spring or another resilient member to return to a predetermined rest position in the absence of the input of external force (e.g., from plants, stems or stalks.) In FIG. 4 and FIG. 5, the row sensing device 62 comprises one or more sensors 66 for detecting the position of each arm 64. The sensor 62 detects a position of the movable arm (e.g., with respect to a reference point associated with the header 16, row sensing device 62 or crop divider 56) or a position versus time response of a corresponding movable arm. The row sensing device 62 is secured to a mounting assembly 72. In one configuration, the mounting assembly 72 mounts the row sensing device 62 above a bottom portion of the point 102 or tip of the crop divider 56.

In FIG. 5, the mounting assembly 72 operably supports the movable arm 64 and the forward point 102, where a rear portion 108 of the forward point 102 is spaced apart from a forward edge 110 of the crop divider 56 and the movable arm 64 is located above a bottom portion 106 of the forward point 102 when the mounting assembly 72 is secured to the crop divider 56. The mounting assembly 72 comprises two forwardly and horizontally extending plates 74, 76, between which the sensor 66 is mounted by fasteners 75, while the arms 64 are fastened to the sensor 66. The plates 74 and 76 comprise upwardly and rearwardly extending rear sections 78 that terminate in generally horizontal strips 80, through which holes are bored. A fastener 82 extends through the holes for retaining a clip 84. In one embodiment, at least a portion of the clip 84 may be inserted into the crop divider 56 through a corresponding mounting interface at the rear of the crop divider 56. Accordingly, where the clip 84 fastens the row sensing device 62 to the crop divider 56, a part or flange of the bottom part of crop divider 56 is located between clip 84 and strip 80.

In front of the arms 64, an extension of the upper plate 74 extends as an upwardly and forwardly extending section 86. In turn, the forwardly extending section 86 extends further forward into a forwardly and downwardly extending front section 88. The forwardly and downwardly front section 88 supports the primary forward point 102, a structural support 90, and a hollow member 98. The front section 88 is secured by means of the fasteners 60 that penetrate holes (e.g., the existing holes for mounting the secondary point 58 as shown in FIG. 3) to a forwardly and downwardly structural member 90. For example, the structural member 90 may comprise a rod, a solid metal or alloy member.

The lower plate 76 turns upward in front of the arms 64 into an upwardly and forwardly extending section 92, that turns into a section (not visible in FIG. 5) extending parallel to structural member 90. The structural member 90 may provide reinforcement, backing or other structural support to the primary forward point 102. In one configuration, a fastener 94 extends through bores in a strip 96 running above and spaced apart from structural member 90 into a hollow member 98.

The hollow member 98 is generally located between a rear edge 108 of the primary forward point 102 and a mounting location (e.g., indicated by fasteners 60) for the mounting assembly 72 for a front part of the crop divider 56. The hollow member 98 has a hollow cross section that mates with or at least partially envelopes the structural member 90. The hollow member 98 and the structural member 90 may have generally rounded, elliptical, or circular cross sections that engage each other. In one illustrative configuration, illustrated in FIG. 4, the rear end of hollow member 98 abuts the forward edge 110 of the crop divider 56. A first cross section of the hollow member 98 is similar in size and shape to a second cross section of the forward edge 110 or front of the crop divider 56.

The primary forward point 102 is used in conjunction with the mounting assembly 72 and the row sensing device 62, whereas the secondary point 58 is used in conjunction with crop dividers 56 that do not use row sensing devices 62. The primary forward point 102 has a similar shape to secondary point 58. In one embodiment, the primary forward point 102 is generally slightly longer than a secondary point 58 for a crop divider 56.

One or more first fasteners 100 connect strip 96, hollow member 98 and the primary forward point 102 to the remainder of the mounting assembly 72. One or more second fasteners 90 fasten the mounting assembly 72 to the crop divider 56. The mounting assembly 72 comprises a strip 60 extending above and spaced apart from the front section 88 which is next to or proximate to extending section 86. The strip 96 and the front section 88 are arranged to clamp the upper front part of the crop divider 56 between them. In the mounted state, the upper front part of crop divider 56 is clamped by fasteners 60 between the strip 96 and structural member 90, where the strip 96 and structural member 90 collectively form a slot or gap for receiving the upper front part of crop divider 56.

The fasteners 60 also mount the front section 88 of the upper plate 76 to structural member 90, because their nuts 104 abut on the lower face of the front section 88. To keep the weight and structural impact on the crop divider 56 comparable to the secondary points 58, the structural member 90 and member 98 are made of aluminum and the point 102 is of ultra high molecular weight (UHMW) plastic (e.g., ultra high molecular weight polyethylene for abrasion resistance). Hollow member 98 can comprise a slot at the bottom face to allow debris to fall on the ground, rather than accumulate or be trapped within a closed or cylindrical cross section.

From the foregoing description, it is apparent that the assembly 72 can be easily retrofitted to existing crop dividers 68, without any significant modifications to the crop divider 56. It is just necessary to remove the fasteners 60, to dismount the secondary point 58, to position the assembly 72 at the forward end of the crop divider 56, if necessary to drill a hole for fastener 82, and to mount the fasteners 60 and 82.

The primary forward point 102 of the assembly 72 protrudes forward and generally extends downward to larger extent than secondary point 58 does. The rear portion 108 of the primary forward point 102 is spaced from or abuts the forward edge 110 of the crop divider 56, as depicted in FIG. 4. The row sensing device 62 is located above a bottom portion 106 of the primary forward point 102 when the assembly is mounted to the crop divider 56. Hence, additional clearance above the ground is provided for the row sensing device 62. Accordingly, the row sensing device 62 interacts with higher parts of the stems, plants or stalks and not with debris or the ground.

Figure 6:
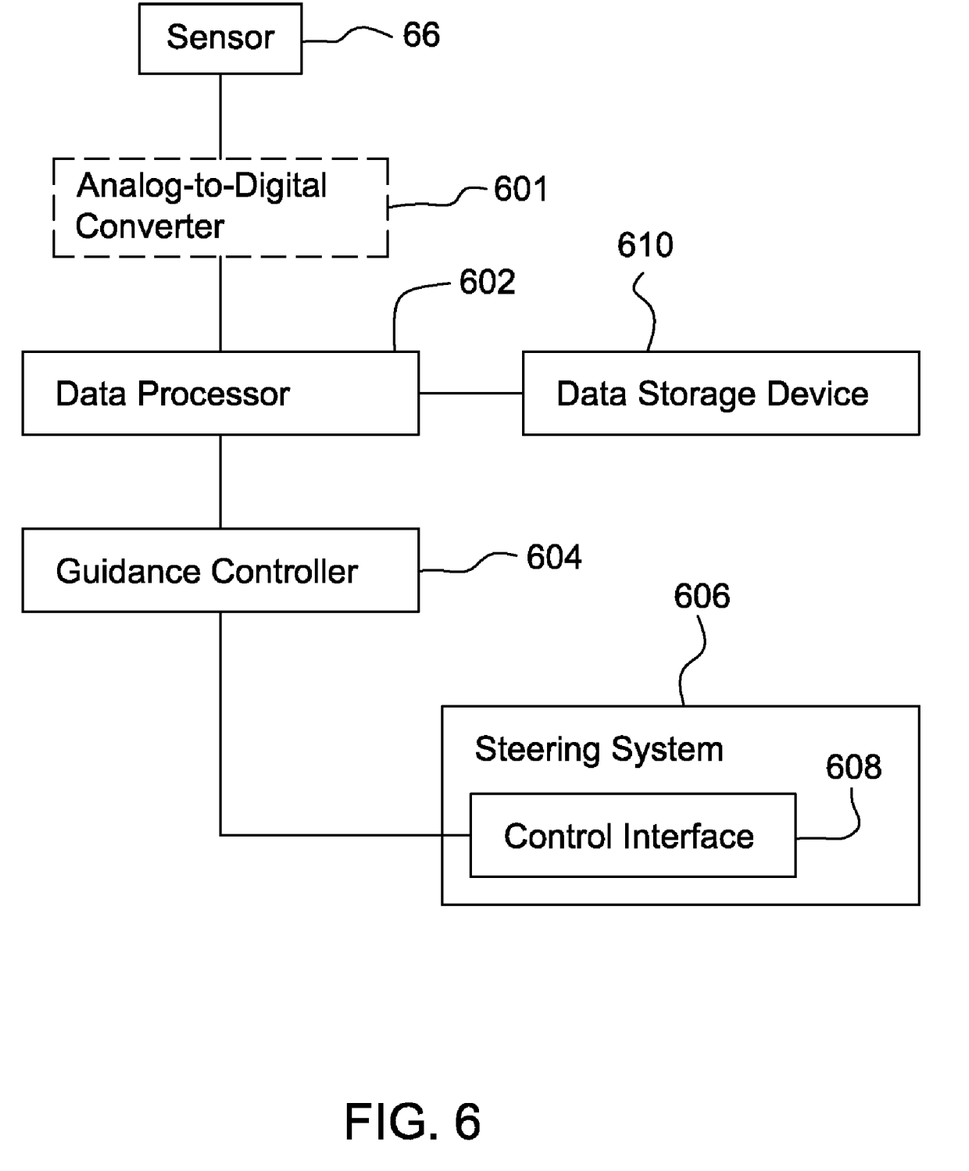
FIG. 6 shows a block diagram of the electronics associated with the row sensing device.

FIG. 6 shows a block diagram of the electronics associated with the row sensing device 62. In one embodiment, the electronics of the row sensing device 62 comprises a sensor 66 coupled to a data processor 602 via an optional analog-to-digital converter 601. The data processor 602 may communicate with a data storage device 610 and a guidance controller 604. In turn, the guidance controller 604 is associated with a control interface 608 of a steering system 606 of the vehicle or harvesting machine 10. The lines interconnecting the elements of FIG. 6 with the data processor 602 and the guidance controller 604 may represent physical data paths, logical data paths, or both. Physical data paths may comprise a data bus or a transmission line, for example. A logical data path may represent time slots allocated on the data bus to form a communications channel or communications (e.g., a call) between software modules or routines, for instance.

The sensor 66 may comprise a potentiometer, a rotational encoder, a switch, a piezoelectric transducer, a piezoresistive transducer, a magnetic field sensor (e.g., Hall Effect sensor), a magnetostrictive sensor, a magnetoresistive sensor, a digital sensor, an analog sensor, or another suitable sensor. In a first example, if the sensor 66 comprises a potentiometer or piezoresistive sensor, the resistance of the potentiometer or piezoresistive sensor varies with the position of a corresponding arm 64. In a second example, the sensor 66 comprises a magnetic field sensor that detects a position of two or more magnets 640 mounted in known locations within the arms 64. In a third example, if the sensor 66 comprises a magnetoresistive sensor, the resistance of the magnetoresistive sensor varies with the position of a magnet 640 in the corresponding arm 64.

The sensor 66 provides an output signal or output data to a data processor 602. If the sensor 66 provides analog output data, the optional analog-to-digital converter 601 may be used to convert the analog output data into digital data for input to the data processor 602. The analog-to-digital converter 601 is shown as a block with dashed lines because it is optional and not required where the sensor 66 outputs digital data.

The data processor 602 may comprise a microprocessor, a microcontroller, a logic circuit, a programmable logic array, a programmable controller, or another device for processing data or the output signal. The data processor 602 may be associated with a data storage device 610 for storing a look-up table, chart, equations, or a database for estimating a position of one or both arms 64 with respect to a reference point on the header 16. In one embodiment, the data processor 602 uses a look-up table, a chart, equations or a database to determine a position (or position versus time) of one or both arms (or the reference point) with respect a reference point associated with the header 16. Further, the data processor 602 may estimate a relative position of the harvesting machine 10 or header 16 with respect to the plants within a generally linear row or a row or set of generally parallel rows with a known contour (e.g., curve radius).

During harvesting operation, the arms 64 may be deformed or moved due to mechanical interaction with the plant stems or stalks if the header 16 is not exactly driven along the rows and the plants (e.g., or their stems or stalks) do not fall exactly at the center of the row unit 54. In one embodiment, the sensor 66 detects the position or displacement of the arms 64 and submits one or more output signals or data to the processor 602. In turn, the processor 602 communicates with a guidance controller 604. The guidance controller 604 may be associated with a steering system 606. The guidance controller 604 may control the steering system 606 by sending steering control data (e.g., steering angle data, heading data, or other guidance data) to a control interface 608. In one embodiment, the control interface 608 controls an actuator in the steering system 606 for steering one or more wheels (e.g., the rear wheels 14 of FIG. 1), such that the harvesting machine 10 is automatically steered along the rows of plants standing on the field. For example, the actuator may comprise an electrical actuator, a solenoid, a hydraulic actuator, or an electro-hydraulic actuator of the steering system 606.

The sensing assembly can be easily retrofitted to an existing header as a single part or in two or more parts, with minimal modifications or no modification of the crop divider. The arms 64 are sufficiently high above the ground, such that the row sensing device 62 does not become clogged with debris, weeds or crop residues and provides superior performance in dense crop. A steering system 606 of a self-propelled harvesting machine controls the wheel position or steering angle of the harvesting machine, either exclusively based upon input from the sensor 66 or in combination with other signals, for example from a satellite based positioning system, a location determining receiver, or an image processing system (e.g., for detecting an edge of a crop).

Having described the preferred embodiment, it will become apparent that various modifications can be made without departing from the scope of the invention as defined in the accompanying claims.

The following is claimed:

1. A sensing assembly for a header for harvesting a crop, the sensing assembly comprising:

a forward point for mounting on a crop divider associated with the header;

at least one movable arm for interacting with one or more plants standing in a field;

a magnetic field sensor for detecting a position of a magnet in the at least one movable arm; and a mounting assembly for operably supporting the at least one movable arm and the forward point; where a rear portion of the forward point is spaced apart from a forward edge of the crop divider and the at least one movable arm is located above a bottom portion of the forward point when the mounting assembly is secured to the crop divider, the mounting assembly comprising a hollow member located between the rear portion of the forward point and the forward edge of the crop divider, the mounting assembly comprising a front section for supporting the forward point and for supporting the hollow member between the front section and the forward point, and the mounting assembly comprising a strip extending above and spaced apart from the front section, the strip and the front section arranged to clamp the upper front part of the crop divider between the strip and the front section.

2. The sensing assembly according to claim 1 wherein the hollow member has a first cross section that conforms to a size and shape of a second cross section of the front edge of the crop divider.

3. The sensing assembly according to claim 1 wherein the sensor is mounted between two generally horizontal plates of the mounting assembly, the forward ends of the plates connected to an extending section and the rearward ends of the plates connectable to a bottom part of the crop divider.

4. The sensing assembly according to claim 1 further wherein the at least moveable arm is composed of a resilient material, the resilient material supporting two or more magnets mounted in known locations in the at least one moveable arm, and the sensor operable to detect the magnetic field or fields associated with one or more of the magnets.

5. The sensing assembly according to claim 1 wherein the at least one arm is composed of an elastomer or an elastically deformable material.

6. The sensing assembly according to claim 1 wherein the at least one arm comprises a rigid member that is coated with an elastomer, an elastically deformable material, a resilient material, or another flexible material.

7. The sensing assembly according to claim 1 wherein the at least one arm comprises two opposite transversely extending arms.

8. The sensing assembly according to claim 1 wherein the mounting assembly further comprises a bottom plate such that the forward point is lower than the bottom plate.

9. The sensing assembly according to claim 1 wherein the magnetic field sensor comprises a sensor selected from the group consisting of a Hall Effect sensor, a magnetostrictive sensor, a magnetoresistive sensor, a digital sensor and an analog sensor.

10. A header for harvesting stalk crops, the header comprising a frame, a plurality of row units mounted to the frame, crop dividers provided between adjacent row units and a sensing assembly mounted to the forward end of one of said crop dividers, the sensing assembly comprising:

a row sensing device comprising at least one movable arm for interacting with plants standing on a field and a magnetic field sensor for detecting the position of a magnet in the arm;

a mounting assembly connected to the crop divider and supporting the row sensing device and a forward point, where the rear edge of the forward point is spaced from a forward edge of the crop divider and the row sensing device is located above a bottom portion of the forward point, the mounting assembly comprising a hollow member located between the rear portion of the forward point and the forward edge of the crop divider, the mounting assembly comprising a front section for supporting the forward point and for supporting the hollow member between the front section and the forward point, and the mounting assembly comprising a strip extending above and spaced apart from the front section, the strip and the front section arranged to clamp the upper front part of the crop divider between the strip and the front section.

11. The header according to claim 10 wherein the hollow member has a first cross section that conforms to a size and shape of a second cross section of the front edge of the crop divider.

12. The header according to claim 10 wherein the sensor is mounted between two generally horizontal plates of the mounting assembly, the forward ends of the plates connected to an extending section and the rearward ends of the plates connectable to a bottom part of the crop divider.

13. The header according to claim 10 further wherein the at least one moveable arm is composed of a resilient material, the resilient material supporting two or more magnets mounted in known locations in the at least one moveable arm, and the sensor operable to detect the magnetic field or fields associated with one or more of the magnets.

14. The header according to claim 10 wherein the at least one arm is composed of an elastomer or an elastically deformable material.

15. The header according to claim 10 wherein the at least one arm comprises a rigid member that is coated with an elastomer, an elastically deformable material, a resilient material, or another flexible material.

16. The header according to claim 10 wherein the magnetic field sensor comprises a sensor selected from the group consisting of a Hall Effect sensor, a magnetostrictive sensor, a magnetoresistive sensor, a digital sensor and an analog sensor.

* * * * *